Figure 1:
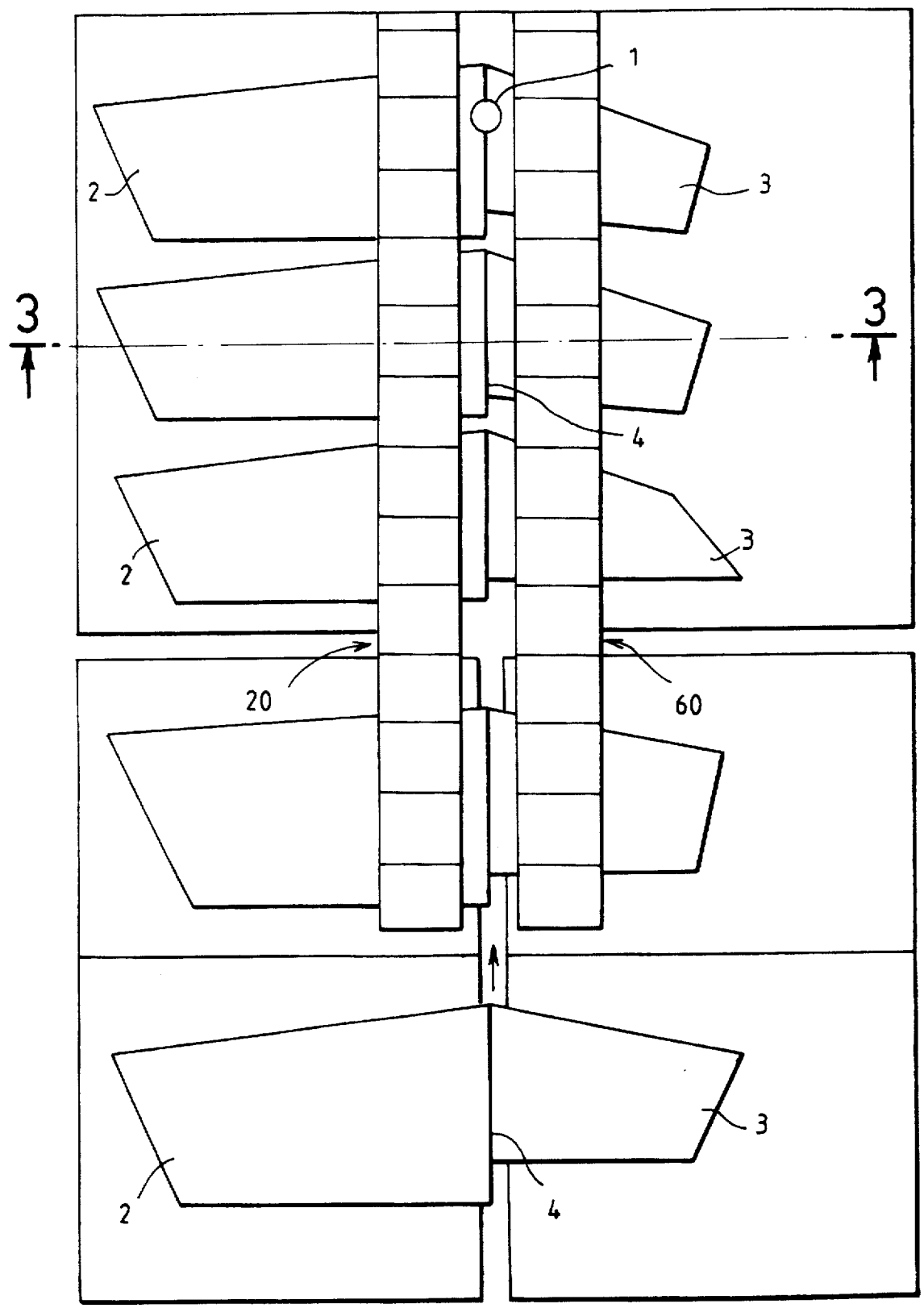

United States Patent [19]
Peru et al.

[11] Patent Number: 5,747,768
[45] Date of Patent: May 5, 1998

[54] DEVICE FOR GUIDING AND FEEDING AT LEAST TWO SHEET BLANKS PREVIOUSLY BROUGHT EDGE TO EDGE TO FORM A JOINT PLANE FOR ENERGY BEAM WELDING

[75] Inventors: Gilles Peru, Dunkerque; Philippe Henry, Mercy-le-Bas, both of France

[73] Assignee: Sollac, Puteaux, France

[21] Appl. No.: 546,359

[22] Filed: Oct. 20, 1995

[30] Foreign Application Priority Data

Nov. 28, 1994 [FR] France ................... 94 14230

[51] Int. Cl.$^6$ ................... B23K 26/00
[52] U.S. Cl. ................... 219/121.63; 219/121.13
[58] Field of Search ................... 219/121.63, 121.64, 219/121.13, 101, 102; 228/4.1, 5.7, 44.3, 49.4

[56] References Cited

U.S. PATENT DOCUMENTS

| | | | |
|---|---|---|---|
| 5,276,304 | 1/1994 | Sauvage et al. | 219/121.63 |
| 5,328,083 | 7/1994 | Peru et al. | 228/44.3 |
| 5,364,006 | 11/1994 | Gilles et al. | |
| 5,375,496 | 12/1994 | Peru et al. | |
| 5,399,834 | 3/1995 | Guth | 219/121.63 |
| 5,536,915 | 7/1996 | Peru et al. | 219/121.63 |

FOREIGN PATENT DOCUMENTS 0 583 999  2/1994  France.

OTHER PUBLICATIONS

08/226,860, Apr. 13, 1994, Pending.
08/250,606, May 27, 1994, Pending.
08/360,439, Dec. 21, 1994, Pending.

Primary Examiner—Geoffrey S. Evans
Attorney, Agent, or Firm—Oblon, Spivak, McClelland, Maier & Neustadt, P.C.

[57] ABSTRACT

Device for guiding and feeding at least two sheet blanks previously brought edge to edge to form a joint plane, of the type including two units for supporting and feeding the sheet blanks in the direction of a high energy density beam disposed on each side of the joint plane and movable in synchronism with each other. Each supporting and feeding unit includes at least one lower series of carriages or at least one upper series of carriages, these carriages being articulated together in a vertical plane and movable in a direction parallel to the joint plane on a runway constituting a reference plane. Each carriage carries at least one shoe movable relative to the respective carriage in a direction perpendicular to the joint plane. The shoes of at least one of the two series of carriages cooperate with a device exerting a lateral pressure on the edges to be welded of the sheet blanks by a displacement of the shoes in a direction perpendicular to the joint plane.

40 Claims, 10 Drawing Sheets

DEVICE FOR GUIDING AND FEEDING AT LEAST TWO SHEET BLANKS PREVIOUSLY BROUGHT EDGE TO EDGE TO FORM A JOINT PLANE FOR ENERGY BEAM WELDING

BACKGROUND OF THE INVENTION

1. Field of the Invention

The present invention relates to a device for guiding at least two sheet blanks previously brought edge to edge in particular for a plant for continuously welding by means of a high energy density beam.

2. Discussion of the Background

Welding by means of a high energy density beam, such as for example a laser beam, two sheet blanks has found a considerable industrial outlet in particular in the butt welding of parts, for example in the automobile industry.

Indeed, butt welded sheet blanks, i.e. blanks assembled edge to edge without overlapping and welded by means of a high energy density beam, retain all their press-forming capability.

The sheet blanks may be of different geometrical shapes and/or of different thicknesses or be of different grades of steel.

For this purpose, it is known for butt welding two sheet blanks to join them and subject the joint plane of said sheet blanks to a high energy density beam by continuously feeding these sheet blanks in a direction perpendicular to the axis of said beam.

Generally, these welding plants comprise a region for laterally positioning one of the sheet blanks relative to the axis of the beam, then a region in which the two sheet blanks are assembled edge to edge, and lastly a region for feeding said blanks under the high energy density beam while maintaining the two sheet blanks edge to edge.

To this end, various devices are known for thus maintaining the sheet blanks in the welding region which employ for each sheet blank vertical clamping systems formed for example by rollers.

But this type of maintaining devices does not permit welding together sheet blanks of different geometric shapes.

A maintaining device is also known which comprises pairs of pallets placed next to each other and each carrying at least one sheet blank.

The sheet blanks are fixed for example by clamping on the pallets.

This device further comprises, in the welding region, inclined pressure rollers for holding the sheet blanks from above.

This device has a drawback which resides mainly in the fact that it does not permit minimizing the gap between the edges to be welded of the two sheet blanks so that, at the moment of welding, the gap increases owing to the thermal expansion of the welded region and consequently results in welds of poor quality.

SUMMARY OF THE INVENTION

An object of the invention is to avoid these drawbacks by providing a device for guiding and feeding at least two sheet blanks previously brought edge to edge which permits controlling the gap between the edges to be welded of the two sheet blanks in the course of their travel throughout the welding operation.

The invention therefore provides a device for guiding and feeding at least two sheet blanks previously brought edge to edge to form a joint plane, in particular in a plant for continuously welding by means of a high energy density beam, of the type comprising two units for supporting and feeding the sheet blanks in the direction toward the high energy density beam, each disposed on each side of the joint plane and movable in synchronism with each other, characterized in that each supporting and feeding unit comprises at least a lower series of carriages articulated together in a vertical plane and movable in a direction parallel to the joint plane on a runway forming a horizontal reference plane, the carriages of said lower series each supporting at least one shoe which is movable relative to said carriages in a direction perpendicular to the joint plane and constitutes a substantially continuous surface of contact with the lower face of the sheet blanks, or at least an upper series of carriages articulated together in a vertical plane, disposed in facing relation to said lower series of carriages and movable on a runway in a direction parallel to the joint plane, the carriages of said upper series each supporting at least one shoe movable relative to said carriages in a direction perpendicular to the joint plane and constituting a substantially continuous surface of contact with the upper surface of the sheet blanks, the shoes of at least one of the two series of carriages being cooperative with means for exerting a lateral pressure on the edges to be welded of the sheet blanks by displacement of said shoes in a direction perpendicular to the joint plane of the sheet blanks, and each supporting and feeding unit being cooperative with means for clamping the corresponding sheet blanks by means of a vertical force.

According to other features of the invention:

the shoes of each series of carriages are independent from one another, each shoe is mounted on the corresponding carriage to be movable in a direction perpendicular to the sheet blanks, each shoe is mounted on the corresponding carriage to be movable in a direction perpendicular to the joint plane by two rolling rails each disposed on each side of the longitudinal axis of said shoe and extending in a direction perpendicular to the joint plane of the sheet blanks, each rolling rail comprises two mounted bars having a rectangular section and provided on confronting sides thereof with a V-shaped groove having a horizontal axis and a strip including cylindrical rollers disposed in said grooves, one of the two bars being fixed to the carriage and the other of said bars being fixed to the corresponding shoe, each carriage comprises at least two rollers having a horizontal axis each disposed on a side of the carriage and cooperative with the corresponding runway for guiding said carriage, each carriage comprises at least one roller having a vertical axis and cooperative with a slot provided in the corresponding runway, said slot constituting a reference axis parallel to the joint plane of the sheet blanks, each shoe comprises a return spring disposed in a cavity provided in the upper face of the corresponding carriage in contact with said shoe, a first end of the return spring being connected to the carriage and a second end of the return spring being connected to a vertical lug fixed to said shoe, each shoe comprises on the face thereof for contact with the sheet blanks a layer of a material, for example a polymer, providing a sufficient coefficient of friction to create adherence to the corresponding sheet blanks, the carriages of each series of carriages are connected to means for shifting said carriages in the direction parallel to the joint plane of the sheet blanks, each shifting means comprise an endless chain which forms a loop in a plane perpendicular to the sheet blanks and is connected to rotary drive means, the means for exerting a lateral pressure on the edges to be welded of the sheet blanks comprise a lateral guideway which is cooperative, on one hand, with the shoes of one of the two series of carriages and, on the other hand, with at least one thrust means exerting a thrust in a direction perpendicular to the joint plane of the sheet blanks, the guideway comprises freely rotatable rollers having a vertical axis, the thrust means comprise at least one cylinder device.

Figure 2:
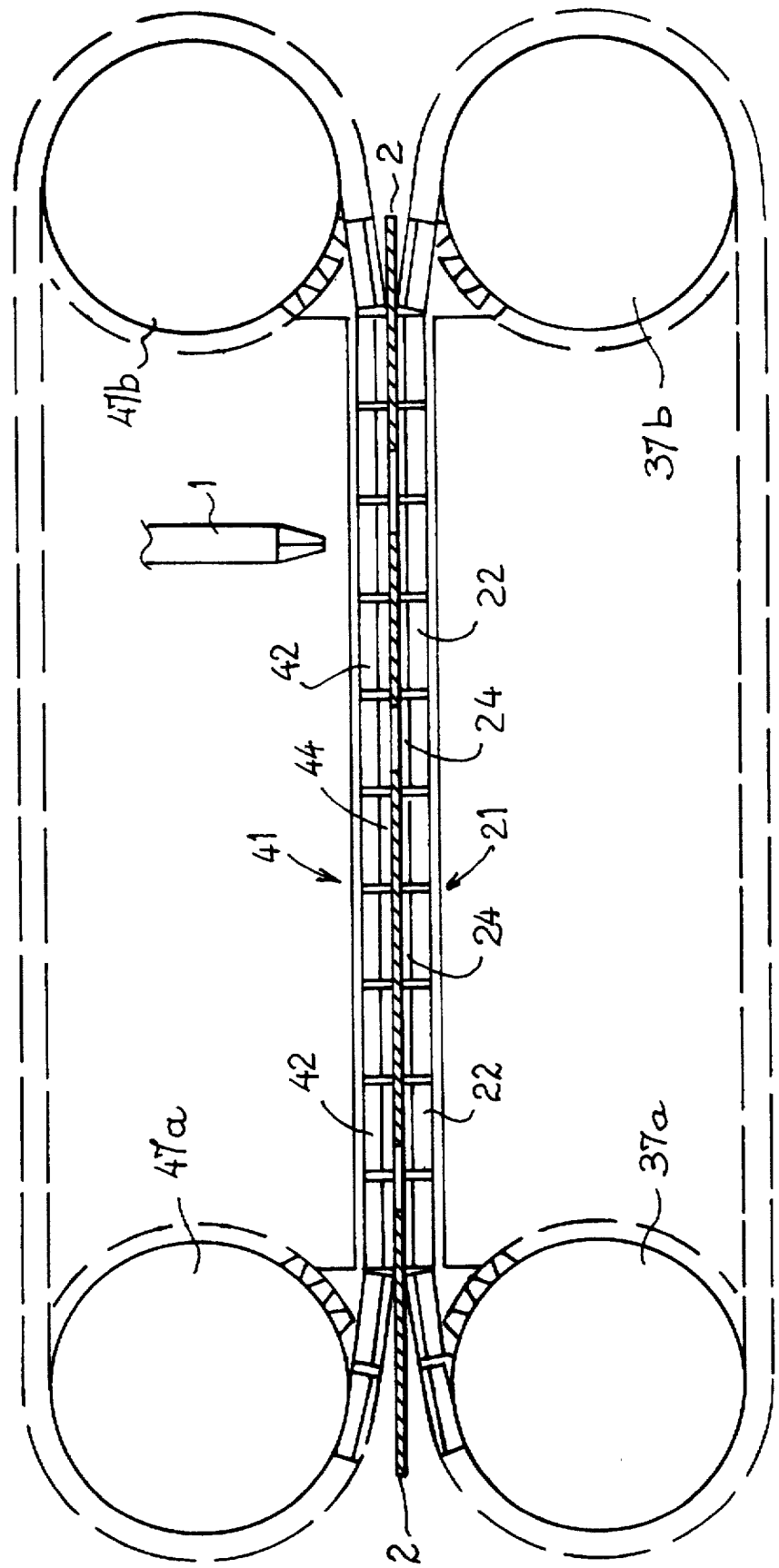
Figure 3:
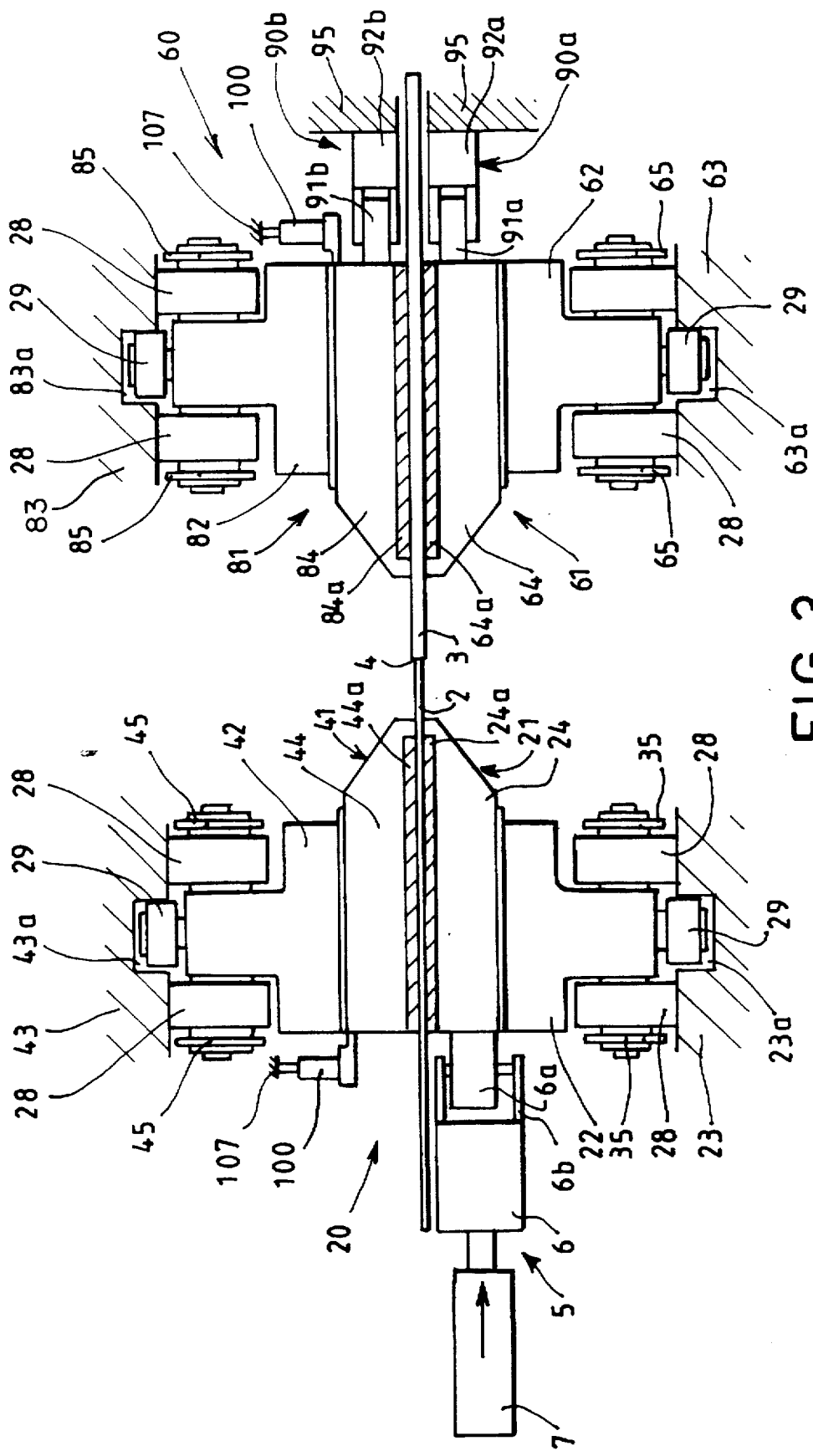
Figure 4:
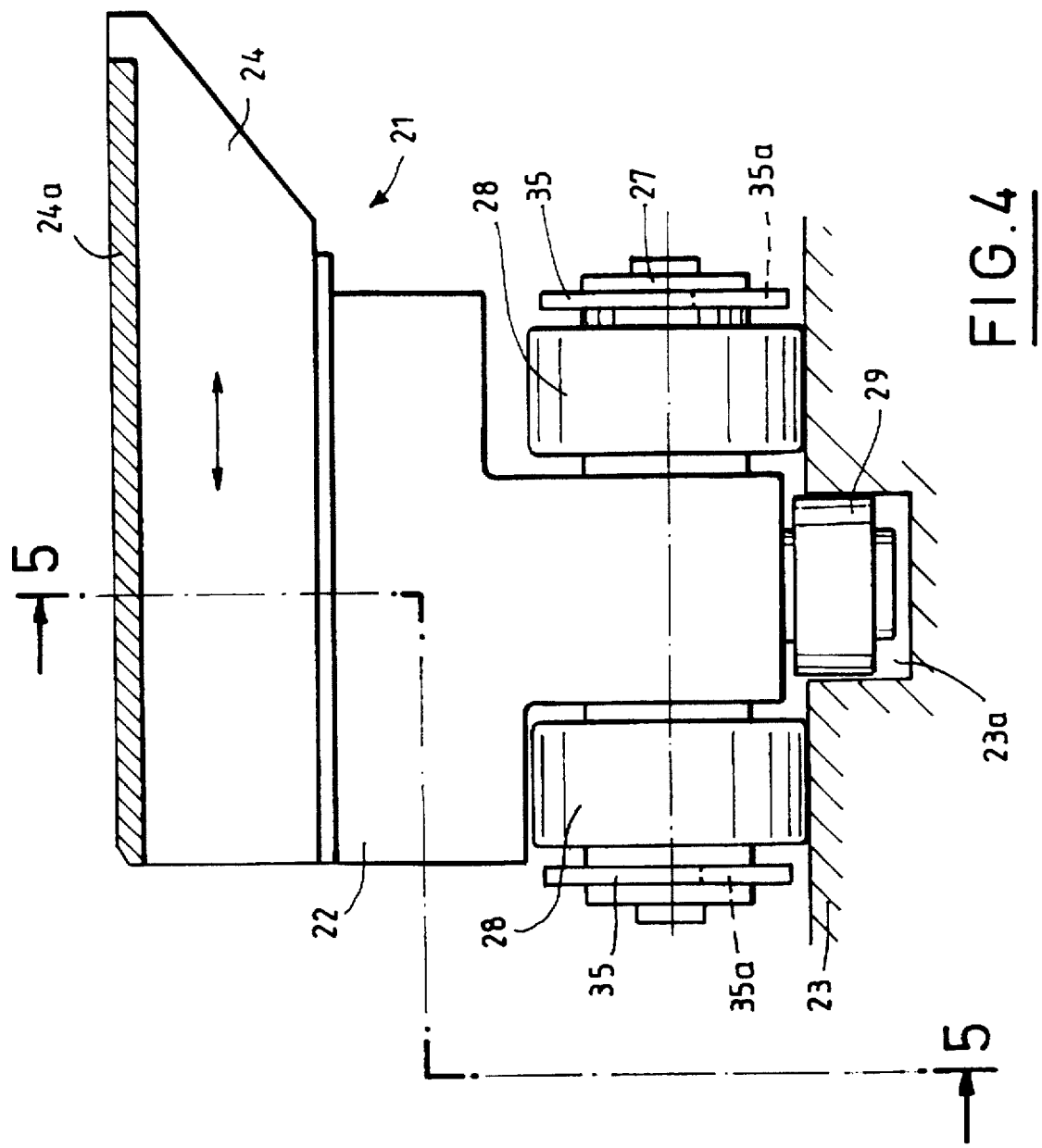
Figure 5:
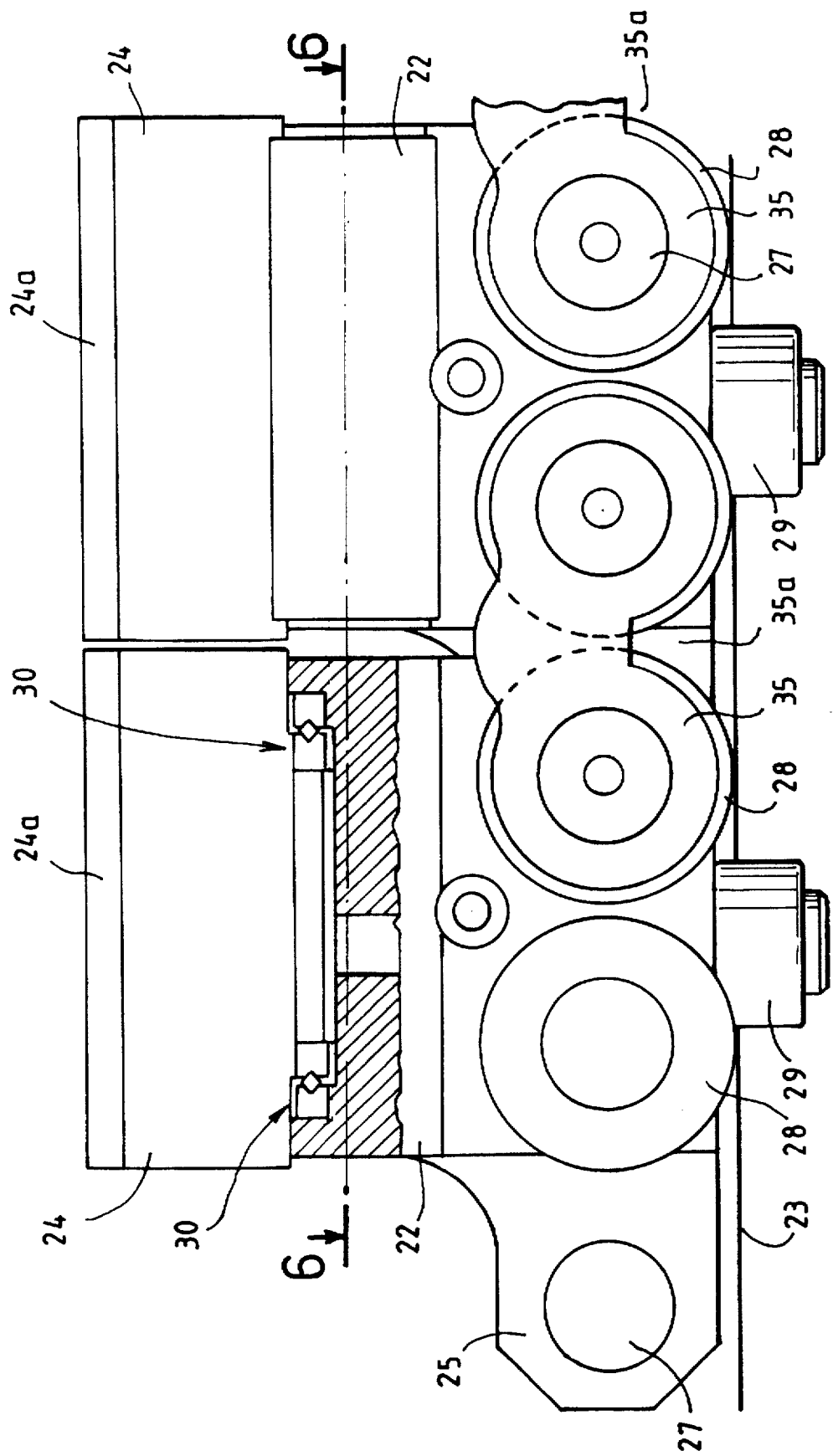
Figure 6:
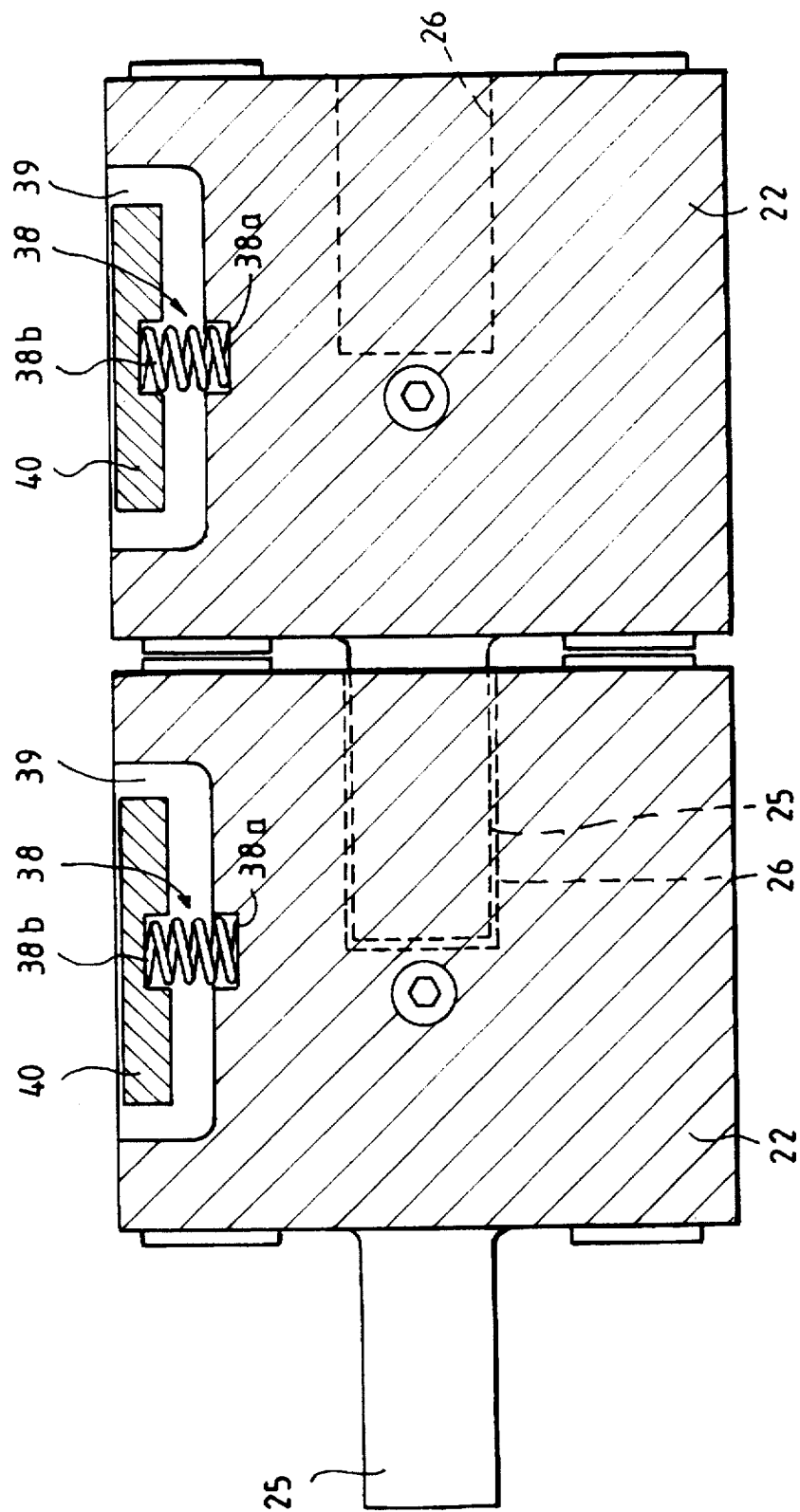
Figure 7:
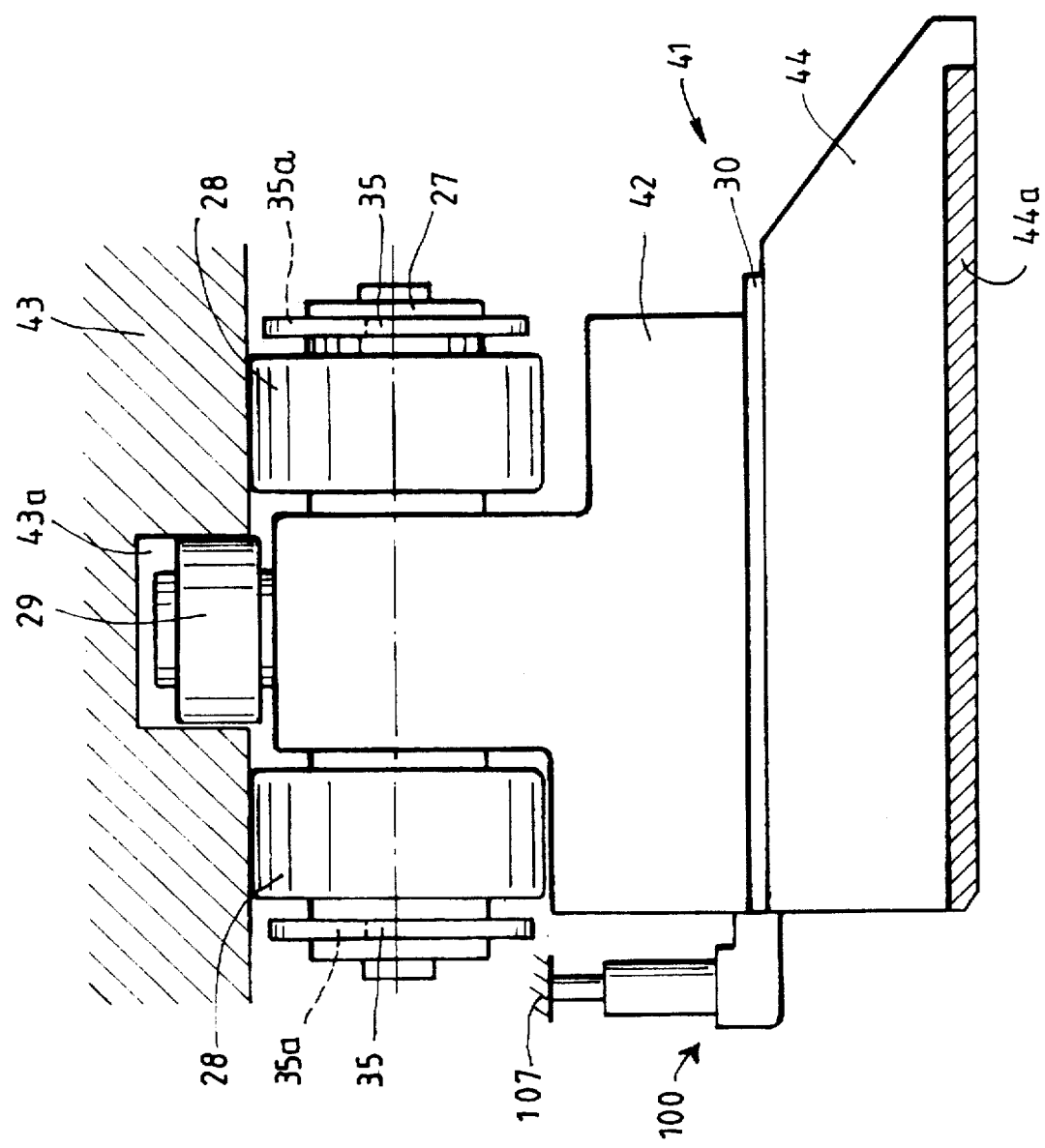
Figure 8:
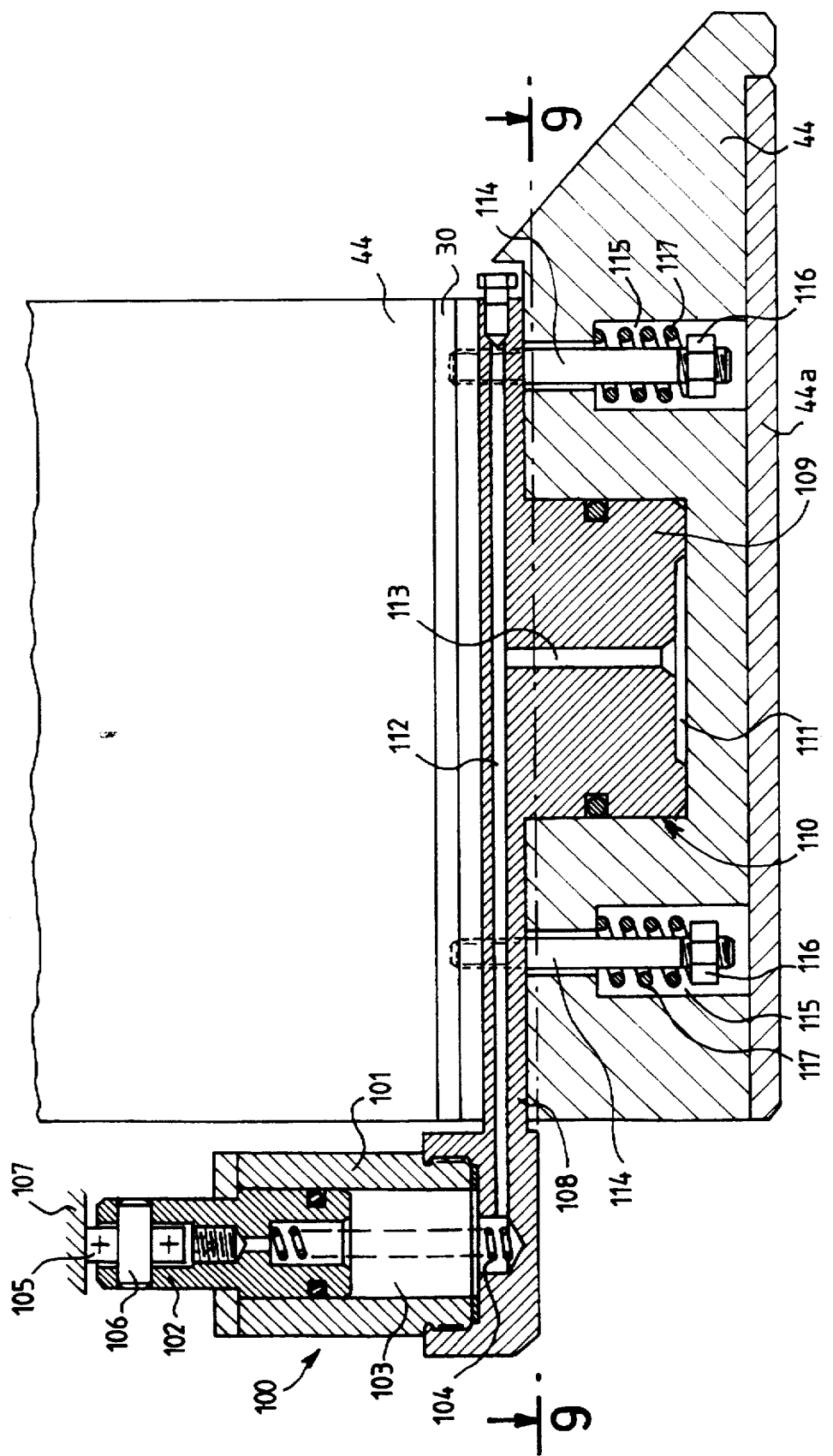
Figure 9:
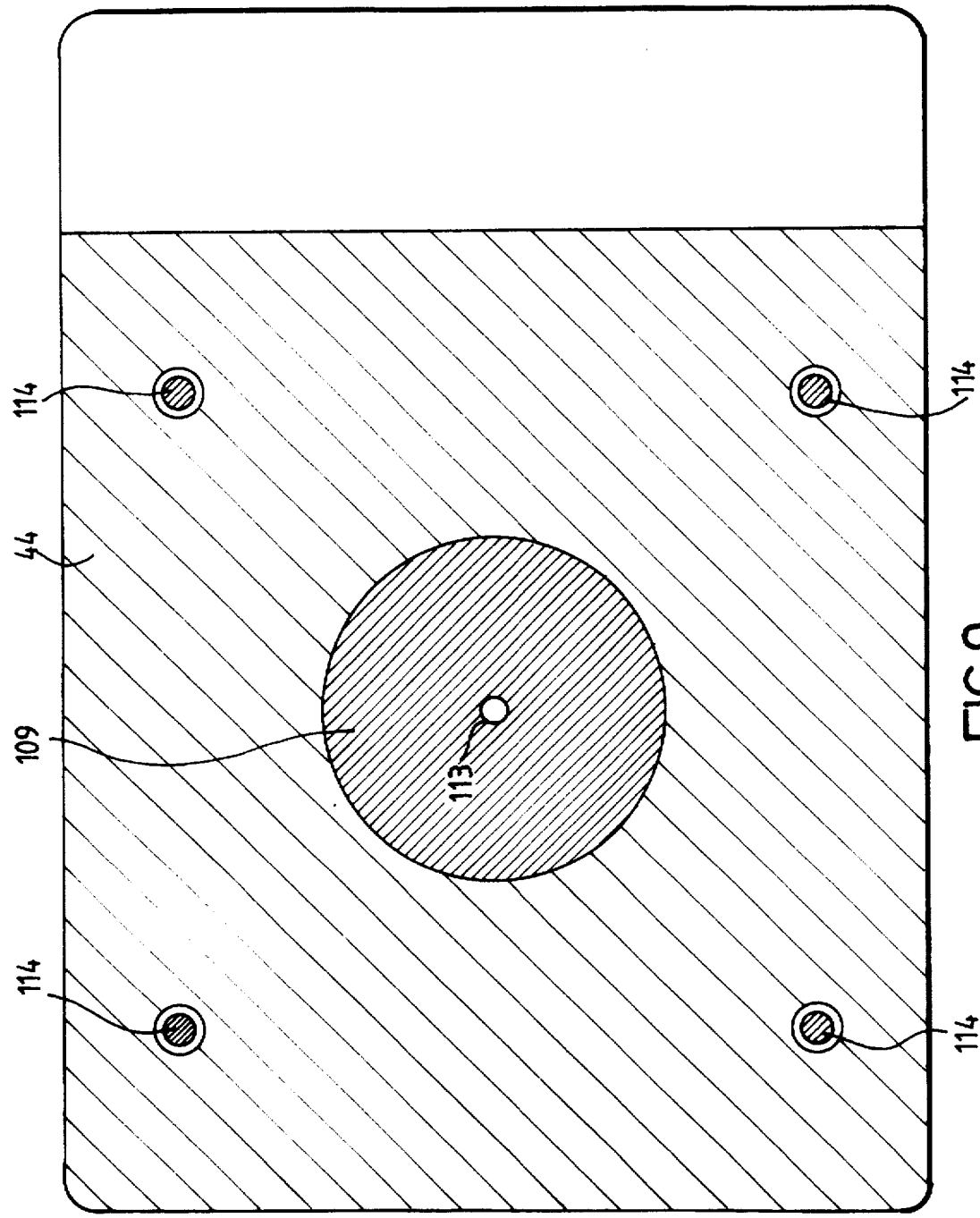
Figure 10:
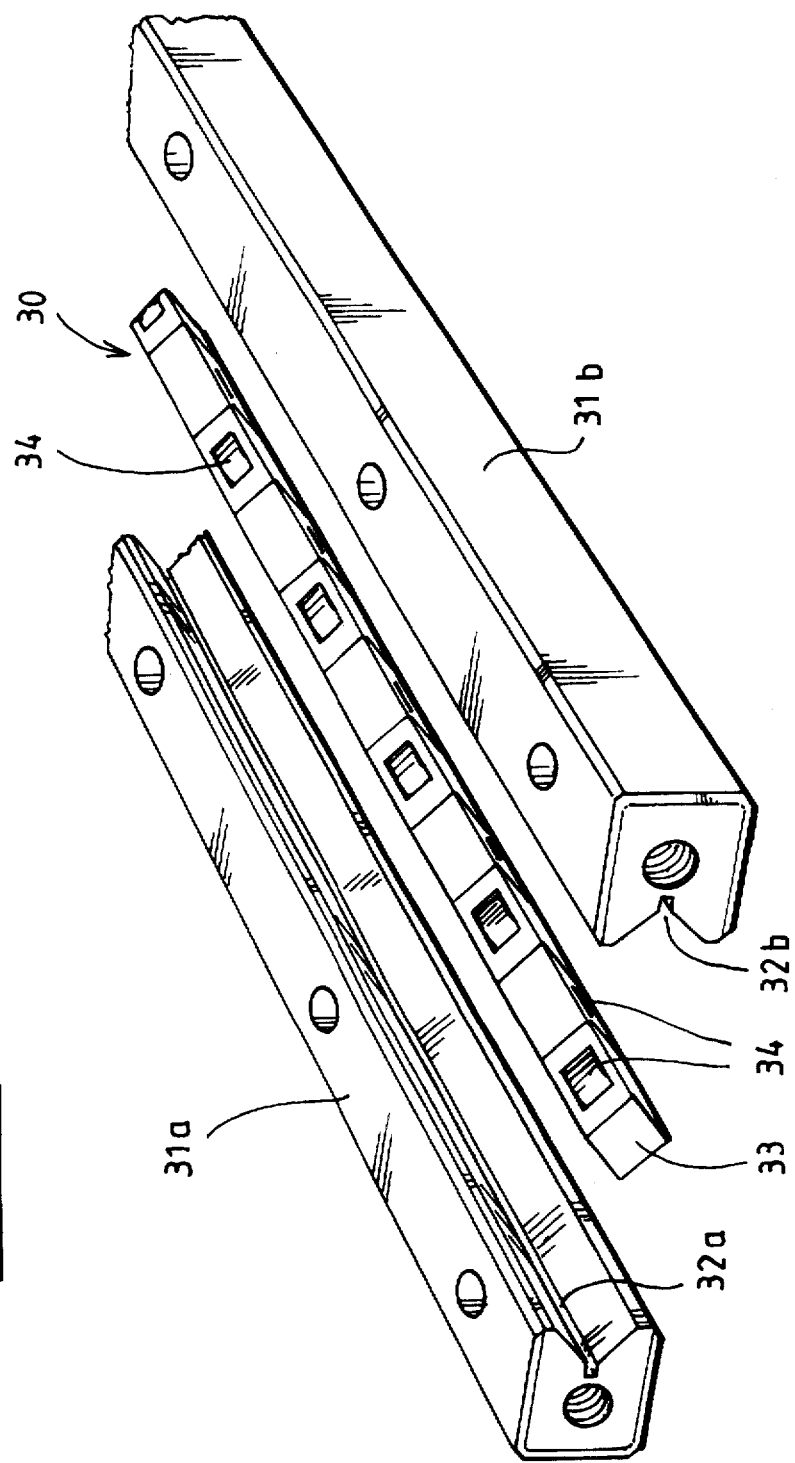

The features and advantages of the invention will be apparent from the following description which is given solely by way of example with reference to the accompanying drawings, in which:

FIG. 1 is a diagrammatic top view of a guiding and feeding device for at least two sheet blanks according to the invention, FIG. 2 is a diagrammatic elevational view of one of the two supporting and feeding units for sheet blanks of the device shown in FIG. 1, FIG. 3 is a diagrammatic sectional view taken on line 3—3 of FIG. 1, FIG. 4 is a diagrammatic elevational view to a larger scale of a carriage and a shoe of a lower sheet blank supporting and feeding unit, FIG. 5 is a partial sectional view taken on line 5—5 of FIG. 4, FIG. 6 is a sectional view taken on line 6—6 of FIG. 5, FIG. 7 is a diagrammatic elevational view to a larger scale of a carriage and a shoe of an upper sheet blank supporting and feeding unit, FIG. 8 is a sectional view of a shoe of an upper sheet blank supporting and feeding unit, FIG. 9 is a sectional view taken on line 9—9 of FIG. 8, and FIG. 10 is a diagrammatic exploded perspective view of a rolling rail disposed between a carriage and a shoe.

The device shown diagrammatically in FIG. 1 is adapted to guide and feed a plurality of pairs of sheet blanks 2 and 3 in a continuous butt welding plant welding said sheet blanks 2 and 3 by means of a high energy density beam 1, such as for example a laser beam.

The sheet blanks 2 and 3 may be of different geometric shapes and/or different thicknesses and may even be of different grades of steel, and are for example intended for the automobile industry or for industries employing semi-finished parts.

In order to guarantee a good quality weld, the two sheet blanks 2 and 3 must satisfy, in the welding region, several requirements concerning in particular the position of the edges to be welded relative to the axis of the high energy density beam 1 and the relative pressure or thrust on said edges for the purpose of controlling and reducing the gap between said edges in the course of the feeding of the sheet blanks 2 and 3.

For this purpose, the device shown in FIGS. 1 and 4 comprises two units 20 and 60 for supporting and feeding the sheet blanks 2 and 3 in the direction toward the high density energy beam 1, each disposed on each side of the joint plane 4 and movable in synchronism with each other.

As shown in FIGS. 2 and 3, the unit 20 for supporting and feeding the sheet blanks 2 comprises a lower series 21 of carriages 22 articulated together in a vertical plane and movable in a plane parallel to the joint plane 4 of the sheet blanks 2 and 3 on a runway 23 constituting a horizontal reference plane.

As will be subsequently seen in detail, the carriages 22 of the lower series 21 each support at least one shoe 24 which is movable relative to said carriages 22 in a direction perpendicular to the joint plane 4 and constitutes a substantially continuous surface of contact with the lower face of the sheet blanks 2.

The unit 20 for supporting and feeding the sheet blanks 2 further comprises an upper series 41 of carriages 42 articulated together in a vertical plane disposed in facing relation to the lower series and movable in a direction parallel to the joint plane 4 on a runway 43.

The carriages 42 of the upper series 41 each support at least one shoe 44 which is movable relative to said carriages 42 in a direction perpendicular to the joint plane 4 of the sheet blanks 2 and 3 and constitutes a substantially continuous surface of contact with the upper face of the sheet blanks 2.

The shoes 24 of the lower series 21 of carriages 22 cooperate with means 5 for exerting lateral pressure on the edges to be welded of the sheet blanks 2 and 3 by displacement of the shoes 24 in a direction perpendicular to the joint plane 4 of said sheet blanks 2 and 3.

With reference to FIGS. 4 to 6, the carriages 22 and the shoes 24 of the lower series 21 will now be described.

As shown in FIGS. 5 and 6, each carriage 22 comprises a tongue 25 at one of its ends, for example the front end relative to the direction of travel of the carriages 22.

Further, each carriage 22 comprises, at its rear end, a groove 26 adapted to receive the tongue 25 of the adjacent carriage.

The carriages 22 are articulated together in a vertical plane by means of a pin 27 which extends through the groove 26 and tongue 25 of two adjacent carriages 22.

Each carriage 22 further comprises at least two rollers 28 having a horizontal axis and each disposed on a side of the carriage 22 and adapted to cooperate with the runway 23 for guiding the carriages 22.

In the embodiment shown in the Figures, each carriage 22 comprises four rollers 28, namely two on one side of the carriage 22 and two on the other side of the latter.

Further, each carriage 22 comprises at least one roller 29 having a vertical axis adapted to cooperate with a slot 23a (FIG. 4) provided in the runway 23.

The slot 23a constitutes a reference axis parallel to the joint plane 4 of the sheet blanks 2 and 3.

The shoes 24 are independent of one another and each shoe 24 is mounted on the corresponding carriage 22 to be movable in a direction perpendicular to the joint plane 4 by means of two rolling rails 30 (FIG. 5) each disposed on each side of the longitudinal axis of said shoe 24 and perpendicular to the joint plane 4 of the sheet blanks 2 and 3.

As shown in FIG. 10, each rolling rail 30 comprises two mounted bars 31a and 31b having a rectangular section and provided on their confronting faces with a V-shaped groove 32a and 32b having a horizontal axis.

The rolling rail 30 further comprises a strip 33 of square section disposed between the bars 31a and 31b in the region of the grooves 32a and 32b.

This strip 33 carries cylindrical rollers 34 which alternately project from each of the faces of said strip 33 so that the two bars 31a and 31b roll with respect to each other.

One of the two bars, for example the bar 31a, is fixed to the carriage 22 and the other of said bars, for example the bar 31b, is fixed to the corresponding shoe 24 which allows a displacement of said shoe 24 in a direction perpendicular to the joint plane 4 of the sheet blanks 2 and 3 and prevents any displacement of said shoe 24 relative to the carriage 22 in a direction parallel to said joint plane 4.

As shown in FIG. 6, each shoe 24 includes a return spring 38 disposed in a cavity 39 provided in the upper face of the corresponding carriage 22 in contact with said shoe 24.

A first end 38a of the return spring 38 is connected to the carriage 22 and a second end 38b of this spring is connected to a vertical lug 40 fixed to the corresponding shoe 24.

The purpose of this return spring 38 is to return the corresponding shoe 24 to its initial position after the edges to be welded of the sheet blanks 2 and 3 have been subjected to a lateral pressure.

The carriages 22 of the series 21 form a loop (FIG. 2) in a vertical plane and this series includes driving means meshing with, on one hand, a first pair of parallel sprockets 37a disposed at one end of the loop and, on the other hand, a second pair of parallel sprockets 37b disposed at the other end of the loop.

As shown in FIGS. 3 to 5, the meshing means of the carriages 22 comprise vertical plates 35 fixed to each end of the pins 27 and on each side of the carriages 22. These vertical plates 35 are evenly spaced apart on the entire length of the loop formed by the carriages 22 and each includes a notch 35a having a shape complementary to that of teeth of the sprockets 37a and 37b. The notches 35a cooperate with the teeth of the sprockets 37a and 37b for driving the carriages 22 and the sprockets 37a and 37b are driven in rotation for example by means of a motor-speed reducer system (not shown) which drives one of the pairs of gears 37a and 37b.

With reference to FIGS. 3, 7 and 8, the carriages 42 and the shoes 44 of the upper series 41 will now be described.

In the same way as the carriages 22 of the lower series 21, the carriages 42 are articulated together in a vertical plane by means of a pin extending through the groove and tongue of two adjacent carriages 42.

Each carriage 42 also comprises at least two rollers 28 having a horizontal axis each disposed on a side of the carriage 42 and adapted to cooperate with a runway 43 for guiding the carriages 42.

Preferably, each carriage 42 comprises four rollers 28, namely two on one side of the carriage 42 and two on the other side of the latter.

Further, each carriage 42 comprises at least one roller 29 having a vertical axis adapted to cooperate with a slot 43a (FIGS. 3 and 7) provided in the runway 43.

The slot 43a also constitutes a reference axis parallel to the joint plane 4 of the sheet blanks 2 and 3.

The shoes 44 are independent of one another and each shoe 44 is mounted on the corresponding carriage 42 to be movable in a direction perpendicular to the joint plane 4 by means of two rolling rails 30 (FIGS. 7 and 8) each extending on opposite sides of the longitudinal axis of said shoe 44 in a direction perpendicular to the joint plane 4 of the sheet blanks 2 and 3.

These rolling rails 30 are identical to those previously described for the carriages 22 and the shoes 24.

One of the two bars, for example the bar 31 of the rolling rails 30, is fixed to the carriage 42 and the other of said bars, for example the bar 31b, is fixed to the corresponding shoe 44 which allows the displacement of the shoe 44 in a direction perpendicular to the joint plane 4 of the sheet blanks 2 and 3 and prevents any displacement of the shoe 44 relative to the carriage 42 in a direction parallel to said joint plane 4.

The carriages 42 of the upper series 41 form a loop (FIG. 2) in a vertical plane and this series comprises means for meshing with, on one hand, a first pair of parallel sprockets 47a disposed at one end of the loop and, on the other hand, a second pair of parallel sprockets 47b disposed at the other end of said loop.

As shown in FIGS. 3 and 7, the meshing means of the carriages 42 are identical to the meshing means of the carriages 22 of the lower series 21 and are formed by vertical plates 45 fixed to each end of the pins 27 on each side of the carriages 42.

The vertical plates 45 are evenly spaced apart throughout the length of the loop formed by the carriages 42 and include notches 45a having a shape complementary to the shape of the teeth of the sprockets 47a and 47b.

The notches 45a cooperate with the teeth of the sprockets 47a and 47b for driving the carriages 42, and the sprockets 47a and 47b are driven in rotation, for example by means of a motor-speed reducer system (not shown) driving one of the pairs of sprockets 47a and 47b.

The shoes 44 of the upper series 41 are also provided with return springs for returning them to the initial position.

The unit 20 for supporting and feeding the sheet blanks 2 cooperates with means 100 for clamping the sheet blanks 2 employing a vertical force.

With reference to FIG. 8, there will now be described the means 100 for clamping by means of a vertical force the sheet blanks 2 in the region of a shoe 44, the clamping means of each shoe 44 being identical.

The clamping means 100 in the region of each shoe 44 comprise a cylinder device having a body 101 and a piston 102 slidably mounted in the body 101.

The body 101 and the piston 102 define an inner chamber 103 containing an incompressible fluid and said piston 102 is returned to the upper position by a spring 104 interposed between the piston 102 and the inner end of the chamber 103.

The piston 102 has in its upper part a roller 105 freely rotatable on a horizontal pin 106 and adapted to cooperate with a rolling track 107, as will be seen hereinafter.

The shoe 44 is supported by the carriage 42 by means of a base 108 and rolling rails 30 interposed between the base 108 and the carriage 42.

The shoe 44 is displaceable relative to the corresponding carriage 42, on one hand, in a direction perpendicular to the joint plane 4 of the sheet blanks 2 and 3, by means of the rolling rails 30 and, on the other hand, in a direction perpendicular to the sheet blanks 2.

For this purpose, the lower face of the base 108 comprises a vertical piston 109 adapted to enter a blind opening 110 provided in the shoe 44.

The lower surface of the vertical piston 109 defines with the inner end of the blind opening 110 a chamber 111 connected to the inner chamber 103 through a first duct 112 provided in the base 108 and a second duct 113 extending through the vertical piston 109.

The shoe 44 is slidably mounted relative to the base 108 on four vertical posts 114.

For this purpose, the upper ends of the posts 114 are fixed in the base 112 and the lower ends of these posts are each disposed in a cavity 115 provided in the shoe 44 and include a nut 116 at the end of each post. A spring 117 is disposed on each post 114 above the nut 116 in the cavity 115 to maintain the shoe 44 close against the base 112.

Each shoe 24 and 44 comprises on the face thereof for engagement with the sheet blanks 2 a layer, respectively 24a and 44a (FIGS. 3, 4 and 8), of a material providing sufficient coefficient of friction to create adherence to the sheet blanks 2.

This material is for example a polymer.

As illustrated in FIG. 3, the means 5 for exerting a lateral pressure on the edges to be welded of the sheet blanks 2 and 3 are formed for example by a lateral guideway 6 which cooperates, on one hand with the shoes 24 and, on the other hand, with at least one thrust means 7 exerting thrust in a direction perpendicular to the joint plane 4 of the sheet blanks 2 and 3.

The guideway 6 is formed by freely rotatable rollers 6a having a vertical axis which bear against the lateral surface of the shoes 24 and are mounted on a support 6b connected to the thrust means 7.

The thrust means 7 is for example a cylinder device.

The unit 60 for supporting and feeding the sheet blanks 3 comprises a lower series 61 of carriages 62 articulated together in a vertical plane and movable in a direction parallel to the joint plane 4 on a runway 63 defining a horizontal reference plane.

The carriages 62 of the lower series 61 each support at least one shoe 64 which is fixed relative to said carriage 62.

The shoes 64 constitute a substantially continuous surface of contact with the lower face of the sheet blanks 3.

The unit 60 for supporting and feeding the sheet blanks 3 further comprises an upper series 81 of carriages 82 articulated together in a vertical plane and disposed in facing relation to the lower series 61 of carriages 62 and movable in a direction parallel to the joint plane 4 on a runway 83.

The carriages 82 of the upper series 81 each support at least one shoe 84 constituting a substantially continuous surface of contact with the upper surface of the sheet blanks 3.

The carriages 62 and the shoes 64 are identical to the carriages 22 and the shoes 24 and the carriages 82 and the shoes 84 are identical to the carriages 42 and the shoes 44.

However, in this case, the shoes 64 and 84 are fixed relative to the carriages 62 and 82 in a direction perpendicular to the joint plane 4 of the sheet blanks 2 and 3 so that these shoes 64 and 84 have neither rolling rails nor return springs.

On the other hand, the shoes 84 are movable relative to the carriages 82 in a direction perpendicular to the sheet blanks 3.

Each shoe 64 and 84 comprises on the face thereof for engagement with the sheet blanks 3 a layer, respectively 64a and 84a, of a material providing sufficient coefficient of friction to create adherence to the sheet blanks 3.

This material is for example a polymer.

The driving of the carriages 62 of the lower series 61 is identical to the driving of the carriages 22 of the lower series 21.

Thus, the carriages 62 of the lower series 61 form a loop in a vertical plane and include means for meshing with two pairs of sprockets each disposed at an end of the loop and identical to the sprockets 37a and 37b.

As shown in FIG. 3, the meshing means of the carriages 62 comprise vertical plates 65 fixed to each end of pins 27 and disposed on each side of the carriages 62.

These vertical plates 65 are evenly spaced apart along the entire length of the loop formed by the carriages 62 and each comprise a notch whose shape is complementary to the shape of the teeth of the sprockets.

Further, the carriages 82 of the upper series 81 are driven in the same way as the carriages 42 of the upper series 41.

For this purpose, the carriages 82 form a loop in a vertical plane and include means for meshing with two pairs of sprockets each disposed at an end of the loop and identical to the sprockets 47a and 47b.

As shown in FIG. 3, the meshing means of the carriages 82 comprise vertical plates 85 fixed at each end of the pins 27 and disposed on each side of the carriages 82.

These vertical plates 85 are evenly spaced apart along the entire length of the loop formed by the carriages 82 and each comprise a notch having a shape complementary to the shape of the teeth of the sprockets.

The unit 60 also comprises means 100 for clamping the sheet blanks 3 by means a vertical force.

These clamping means 100 exerting a vertical force on the sheet blanks 3 are identical to the clamping means 100 of the sheet blanks 2.

The guiding and feeding device according to the invention further comprises means for maintaining the edge to be welded of one of the sheet blanks 2 or 3 in register in a vertical plane on the axis of the high energy density beam 1.

These means for maintaining in register in a vertical plane the edge to be welded of one of the sheet blanks, for example the sheet blank 3, comprise two lateral and parallel guideways 90a and 90b disposed on each side of the horizontal plane of the sheet blanks 2 and 3.

As shown in FIG. 3, the guideway 90a comprises freely rotatable rollers 91a having a vertical axis, said rollers 91a bearing against the lateral surface of the shoes 64 and being mounted on a support 92a fixed on a vertical reference surface 95.

The guideway 90b also comprises freely rotatable rollers 91b having a vertical axis which bear against the lateral surface of the shoes 84 and are mounted on a support 92b fixed to the vertical reference surface 95.

Thus, as shown in FIG. 3, the shoes 24 and 44 define with the opposite shoes 64 and 84 a sufficient space for positioning the high energy density beam 1 and welding the edges of the sheet blanks 2 and 3.

Further, the lateral face of the shoes, respectively 24, 44, 64 and 84, facing toward the edges to be welded of the sheet blanks 2 and 3 is bevelled, whereas the opposite lateral face is planar and vertical.

In the welding region, the rollers 105 of the means 100 for clamping the sheet blanks 2 and 3 progressively come into contact with the rolling tracks 107 and this results in the successive descent of the pistons 102 in opposition to the action of the return spring 104 in respect of each shoe 44 and 84 entering this welding region.

The incompressible fluid travels from the inner chambers 103, into the chambers 111 of the shoes 44 and 84 and in this way exerts a vertical pressure on the surface of said shoes and grips the sheet blanks 2 and 3 respectively between the shoes 24 and 44; 64 and 84.

Consequently, each sheet blank 2 and 3 is progressively gripped between the shoes 24, 44, 64 and 84 and then driven by the effect of adherence between these shoes owing to the vertical pressure exerted by the shoes 44 and 84.

The units 20 and 60 are driven in synchronism with each other, which permits driving the sheet blanks 2 and 3 in the direction toward the high energy density beam 1 with no possibility of slip between the sheet blanks and the shoes under pressure.

The vertical reference surface 95 permits positioning the edge to be welded of the sheet blank 3 on the axis of the high energy density beam 1 and applying the edge to be welded of the sheet blank 2 against this edge to be welded of the sheet blank 3 which constitutes a reference plane in alignment with the axis of the high energy density beam 1.

In the welding region, the means for exerting a lateral pressure exert, through the shoes 24 and 44, a force on the sheet blank 2 in a direction perpendicular to the joint plane 4 and consequently a pressure in the region of this joint plane which permits controlling the gap between the edges to be welded of the two sheet blanks in the course of their travel throughout the welding operation and avoiding a separation of the edges to be welded owing to the expansion of the sheet blanks during this welding.

The force applied is balanced by the pressure of contact between the sheet blanks while a relative slip between the sheet blanks and the shoes is avoided.

The runways 23 and 63 constitute the horizontal reference surfaces and this permits positioning the face of the shoes 24 and 64 in contact with the lower faces of the sheet blanks 2 and 3 in a horizontal plane and in this way obtaining an alignment of the edges to be welded of the sheet blanks 2 and 3.

In the embodiment described above, each unit 20 and 60 comprises a lower series 21 and 61 of carriages 22 and 62 and an upper series 41 and 81 of carriages 42 and 82.

In an alternative embodiment, each unit 20 and 60 may comprise either a lower series 21 and 61 of carriages 22 and 62 each supporting at least one shoe 24 and 64 or an upper series 41 and 81 of carriages 42 and 82 each supporting at least one shoe 44 and 84.

In this case, the shoes of the series which does not comprise carriages may cooperate for example with freely rotatable support rollers adapted to cooperate with the face of the shoes remote from the face in contact with the corresponding sheet blank.

The mounting of the shoes 24 and 44 on rolling rails to permit the displacement of these shoes in a direction perpendicular to the joint plane 4 of the sheet blanks 2 and 3 permits disassociating the transverse movement of said shoes from the longitudinal movement of the carriages 22 and 42 supporting these shoes, thereby avoiding a deterioration in the region of the articulated connection between the adjacent carriages of the same series of carriages.

Further, the mounting of the shoes 44 and 84 on the vertical piston 109 supported by a base fixed to the corresponding carriage 42 and 82 permits disassociating the vertical movement of the shoes from that of the carriages.

What is claimed is:

1. Device for guiding and feeding at least two sheet blanks previously brought edge to edge to form a joint plane welded by means of a high energy density beam, which comprises:

a first unit and a second unit for supporting and feeding said sheet blanks in a direction toward said beam, said units being disposed on opposite sides of said joint plane and movable in synchronism with each other, each unit comprising in combination:

a first runway defining a horizontal reference plane, a series of carriages articulated together in a vertical plane and mounted to be movable relative to said runway in a direction parallel to said joint plane, a series of first shoes carried by respective ones of said carriages and constituting a substantially continuous surface of contact with a first face of said sheet blanks, a second runway defining a horizontal reference plane, a series of second shoes disposed in facing relative to said first shoes, support means for supporting said second shoes relative to said second runway such that said second shoes are movable relative to said second runway in a direction parallel to said joint plane, said second shoes constituting a substantially continuous surface of contact with a second face of said sheet blanks on the opposite side of said sheet blanks to said first face;

means for moving said first shoes of said first unit relative to said respective carriages in a direction perpendicular to said joint plane and for moving said second shoes of said first unit relative to said second runway in a direction perpendicular to said joint plane;

said device further comprising in combination:

means cooperative with said first shoes of said first unit for shifting said first shoes of said first unit in a direction perpendicular to said joint plane for exerting a lateral pressure on said edges to be welded of said sheet blanks;

and means cooperative with said second shoes of each unit for exerting a substantially vertical force on and clamping the respective sheet blanks said means for exerting a substantially vertical force being separated from said means for shifting said first shoes for exerting said lateral pressure on said edges to be welded of said sheet blanks.

2. Device for guiding and feeding at least two sheet blanks previously brought edge to edge to form a joint plane welded by means of a high energy density beam, which comprises:

a first unit and a second unit for supporting and feeding said sheet blanks in a direction toward said high energy density beam, said units being disposed on opposite sides of said joint plane and movable in synchronism with each other and each unit comprising in combination:

a first runway defining a horizontal reference plane, a first series of carriages articulated together in a vertical plane and movable on said runway in a direction parallel to said joint plane, and first shoes carried by respective ones of said carriages of said first series and constituting a substantially continuous surface of contact with a first face of said sheet blanks, a second runway defining a horizontal reference plane, a second series of carriages articulated together in a vertical plane disposed in facing relation with respect to said first series of carriages and movable on said second runway in a direction parallel to said joint plane, and second shoes carried by respective ones of said carriages of said second series and constituting a substantially continuous surface of contact with a second face of said sheet blanks on the opposite side of said sheet blanks to said first face;

means for moving said first shoes and said second shoes of said first unit relative to the respective carriages in a direction perpendicular to said joint plane;

said device further comprising in combination:

means cooperative with said first shoes of said first unit for shifting said first shoes of said first unit in a direction perpendicular to said joint plane for exerting a lateral pressure on said edges to be welded of said sheet blanks;

and means cooperative with said second shoes of each unit for exerting a vertical force on and clamping the respective sheet blanks, said means for exerting a substantially vertical force being separated from said means for shifting said first shoes for exerting said lateral pressure on said edges to be welded of said sheet blanks.

3. Device according to claim 1, wherein said series of first shoes and said series of second shoes are independent of one another.

4. Device according to claim 1, wherein each first shoe is mounted on the respective carriage to be movable in a direction perpendicular to said sheet blanks.

5. Device according to claim 1, wherein each first shoe has a longitudinal axis perpendicular to said joint plane and is mounted on the respective carriage to be movable in a direction perpendicular to said joint plane by means comprising two rolling rails extending on respective sides of said longitudinal axis in directions perpendicular to said joint plane.

6. Device according to claim 5, wherein each rolling rail comprises two mounted bars having a rectangular section provided on confronting faces of said bars with a V-shaped groove having a horizontal axis, and a strip carrying cylindrical rollers disposed in said grooves, one of said two bars being fixed to said respective carriage and the other of said two bars being fixed to said first shoe.

7. Device according to claim 1, wherein each carriage comprises at least two rollers having a horizontal axis each disposed on a side of each carriage and being cooperative with said first runway for guiding said carriage.

8. Device according to claim 1, wherein each carriage comprises at least one roller having a vertical axis and cooperative with a slot provided in said first runway, said slot constituting a reference axis parallel to said joint plane.

9. Device according to claim 1, wherein each first shoe comprises a lug fixed thereto, a cavity provided in an upper face of the respective carriage in contact with said first shoe, a return spring disposed in said cavity, a first end of said return spring being connected to said respective carriage and a second end of said return spring being connected to said lug.

10. Device according to claim 1, wherein each shoe comprises on a face thereof for contact with said sheet blanks a layer of a material providing a sufficient coefficient of friction to create adherence to the respective sheet blanks.

11. Device according to claim 10, wherein said material is a polymer.

12. Device according to claim 1, wherein said carriages are arranged in a loop in said vertical plane and include means for meshing with two pairs of parallel sprockets disposed at respective ends of said loop.

13. Device according to claim 12, wherein said meshing means comprise vertical plates disposed on each side of said carriages and evenly spaced apart along the entire length of said loop, each vertical plate including a notch having a shape complementary to the shape of teeth of said sprockets.

14. Device according to claim 1, wherein said means for exerting a lateral pressure on said edges to be welded of said sheet blanks comprise thrust means for exerting a thrust in a direction perpendicular to said joint plane, and a lateral guideway which is cooperative, on one side, with said first shoes and, on the other side, with said thrust means.

15. Device according to claim 14, wherein said guideway comprises freely rotatable rollers having a vertical axis.

16. Device according to claim 14, wherein said thrust exerting means comprise at least one cylinder device.

17. Device according to claim 4, wherein each first shoe is mounted to be movable in a direction perpendicular to said sheet blanks by means comprising a base fixed to the respective carriage, a blind opening provided in the first shoe, a vertical piston carried by said base and disposed in said blind opening and defining a chamber with said blind opening.

18. Device according to claim 17, wherein said means for clamping said sheet blanks comprise for each first shoe: a substantially vertical cylinder device comprising in combination a cylinder, a second piston in said cylinder defining an inner chamber, a roller carried by an upper end of said second piston and cooperative with a rolling track, said inner chamber containing an incompressible fluid and communicating with said chamber provided in the respective first shoe through a first duct disposed in said base and a second duct extending through said vertical piston.

19. Device for guiding and feeding at least two sheet blanks previously brought edge to edge to form a joint plane welded by means of a high energy density beam, which comprises:

a first unit and a second unit supporting and feeding said sheet blanks in a direction toward said beam, said units being disposed on opposite sides of said joint plane and movable in synchronism with each other, each unit comprising in combination:

a first runway defining a horizontal reference plane, a series of carriages articulated together in a vertical plane and mounted to be movable relative to said runway in a direction parallel to said joint plane, a series of first shoes carried by respective ones of said carriages and constituting a substantially continuous surface of contact with a first face of said sheet blanks, a second runway defining a horizontal reference plane, a series of second shoes disposed in facing relative to said first shoes, a support supporting said second shoes relative to said second runway such that said second shoes are movable relative to said second runway in a direction parallel to said joint plane, said second shoes constituting a substantially continuous surface of contact with a second face of said sheet blanks on the opposite side of said sheet blanks to said first face;

a mechanism moving said first shoes of said first unit relative to said respective carriages in a direction perpendicular to said joint plane and moving said second shoes of said first unit relative to said second runway in a direction perpendicular to said joint plane;

said device further comprising in combination:

a shifting mechanism cooperative with said first shoes of said first unit and shifting said first shoes of said first unit in a direction perpendicular to said joint plane and exerting a lateral pressure on said edges to be welded of said sheet blanks;

and a mechanism cooperative with said second shoes of each unit and exerting a substantially vertical force on and clamping the respective sheet blanks, said mechanism exerting a substantially vertical force being separated from said mechanism shifting said first shoes and exerting said lateral pressure on said edges to be welded of said sheet blanks.

20. Device for guiding and feeding at least two sheet blanks previously brought edge to edge to form a joint plane welded by a high energy density beam, which comprises:

a first unit and a second unit supporting a feeding said sheet blanks in a direction towards said high energy density beam, said units being disposed on opposite sides of said joint plane and being movable in synchronism with each other and each unit comprising in combination:

a first runway defining a horizontal reference plane, a first series of carriages articulated together in a vertical plane and movable on said runway in a direction parallel to said joint plane, and first shoes carried by respective ones of said carriages of said first series and constituting a substantially continuous surface of contact with a first phase of said sheet blanks, a second runway defining a horizontal reference plane, second series of carriages articulated together in a vertical plane disposed in facing relation with respect to said first series of carriages and movable on said runway in a direction parallel to said joint plane, and second shoes carried by a respective ones of said carriages on said second series and constituting a substantially continuous surface of contact with a second phase of said sheet blanks on the opposite side of said sheet blanks to said first phase;

a moving mechanism moving said first shoes and second shoes of said first unit relative to the respective carriages in a direction perpendicular to said joint plane;

said device further comprising in combination:

a shifting mechanism cooperative with said first shoes of said first unit and shifting said first shoes of said first unit in a direction perpendicular to said joint plane and exerting a lateral pressure on said edges to be welded of said sheet blanks; and a mechanism cooperative with said second shoes of each unit for exerting a vertical force on and clamping the respective sheet blanks, said mechanism exerting a substantial vertical force being separated from said mechanism shifting said first shoes for exerting said lateral pressure on said edges and be welded of said sheet blanks.

21. Device according to claim 19, wherein said series of first shoes and said series of second shoes are independent of one another.

22. Device according to claim 19, wherein each first shoe is mounted on the respective carriage to be movable in a direction perpendicular to said sheet blanks.

23. Device according to claim 19, wherein each first shoe has a longitudinal axis perpendicular to said joint plane and is mounted on the respective carriage to be movable in a direction perpendicular to said joint plane by two rolling rails extending on respective sides of said longitudinal axis and directions perpendicular to said joint plane.

24. Device according to claim 22, wherein each rolling rail comprises two mounted bars having a rectangular section provided on confronting faces of said bars with a V-shaped groove having a horizontal axis, and a strip carrying cylindrical rollers disposed in said grooves, one of said two bars being fixed to said respective carriage and the other of said two bars being fixed to said first shoe.

25. Device according to claim 19, wherein each carriage comprises at least two rollers having horizontal axis each disposed on a side of each carriage and being cooperative with said first runway for guiding said carriage.

26. Device according to claim 19, wherein each carriage comprises at least one roller having a vertical axis and cooperative with the slot provided in said first runway, said slot constituting a reference axis parallel to said joint plane.

27. Device according to claim 19, wherein each first shoe comprises a lug fixed thereto, a cavity provided in an upper face of the respective carriage contact with said first shoe, a return spring disposed in said cavity, a first end of said return spring being connected to said respective carriage and a second end of said return spring being connected to said lug.

28. Device according to claim 19, wherein each shoe comprises on a face thereof for contact with said sheet blanks a layer of a material providing a sufficient coefficient of friction as to create adherence to the respective sheet blanks.

29. Device according to claim 27, wherein said material comprises a polymer.

30. Device according to claim 19, wherein said carriages are arranged in a loop in said vertical plane and include a meshing mechanism meshing with two pairs of parallel sprockets disposed at respective ends of said loop.

31. Device according to claim 29, wherein said meshing mechanism comprises vertical plates disposed on each side of said carriages and evenly spaced apart along the entire length of said loop, each vertical plate including a notch having a shape complimentary to the shape of teeth of said sprockets.

32. Device according to claim 19, wherein said mechanism exerting a lateral pressure on said edges to be welded of said sheet blanks comprises a thrust mechanism exerting a thrust in a direction perpendicular to said joint plane, and a lateral guideway which is cooperative, on one side, with said first shoes and, on the other side, with said thrust mechanism.

33. Device according to claim 31, wherein said guideway comprises freely rotatable rollers having a vertical axis.

34. Device according to claim 31, said thrust exerting mechanism comprises at least one cylinder device.

35. Device according to claim 22, wherein each first shoe is mounted to be movable in a direction perpendicular to said sheet blanks by a mechanism comprising a base fixed to the respective carriage, a blind opening provided in the first shoe, a vertical piston carried by said base and disposed in said blind opening and defining a chamber with said blind opening.

36. Device according to claim 35, wherein said mechanism clamping said sheet blanks comprise for each first shoe: a substantially vertical cylinder device comprising in combination a cylinder, a second piston in said cylinder defining an inner chamber, a roller carried by an upper end of said second piston and cooperative with the rolling track, said inner chamber containing an incompressible fluid and communicating with said chamber provided in the respective first shoe through a first duct disposed in said base and a second duct extending through said vertical piston.

37. Device according to claim 1, wherein said means for exerting a substantially vertical force comprises a hydraulic device.

38. Device according to claim 2, wherein said mechanism exerting a substantially vertical force comprises a hydraulic device.

39. Device according to claim 19, wherein said mechanism exerting a substantially vertical force comprises a hydraulic device.

40. Device according to claim 20, wherein said mechanism exerting a substantially vertical force comprises a hydraulic device.

* * * * *